(12) United States Patent
Kelly et al.

(10) Patent No.: US 7,195,065 B2
(45) Date of Patent: Mar. 27, 2007

(54) STABILIZING CROSSLINKED POLYMER GUARS AND MODIFIED GUAR DERIVATIVES

(75) Inventors: Patrick Arthur Kelly, Conroe, TX (US); Allen Dale Gabrysch, Houston, TX (US); Donald Nelson Horner, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 323 days.

(21) Appl. No.: 10/911,898

(22) Filed: Aug. 5, 2004

(65) Prior Publication Data
US 2006/0027364 A1   Feb. 9, 2006

(51) Int. Cl.
*E21B 43/04* (2006.01)
*C09K 7/00* (2006.01)
(52) U.S. Cl. .................................. 166/278; 507/273
(58) Field of Classification Search ............. None
See application file for complete search history.

(56) References Cited

U.S. PATENT DOCUMENTS

| 4,579,670 | A |   | 4/1986  | Payne |
| 4,627,495 | A | * | 12/1986 | Harris et al. ............ 166/280.1 |
| 5,103,913 | A |   | 4/1992  | Nimerick et al. |
| 5,160,445 | A | * | 11/1992 | Sharif .................. 507/203 |
| 5,252,235 | A |   | 10/1993 | Sharif |
| 5,305,832 | A |   | 4/1994  | Gupta et al. |
| 5,372,732 | A | * | 12/1994 | Harris et al. ............ 507/217 |
| 5,827,804 | A |   | 10/1998 | Harris et al. |
| 6,387,853 | B1 |  | 5/2002  | Dawson et al. |
| 6,605,570 | B2 |  | 8/2003  | Miller et al. |
| 6,632,779 | B1 |  | 10/2003 | Vollmer et al. |
| 6,667,354 | B1 |  | 12/2003 | Fox et al. |

FOREIGN PATENT DOCUMENTS

EP   0 921 171 A1   6/1999

OTHER PUBLICATIONS

PCT International Search Report for International Application No. PCT/US2005/027662, Jan. 30, 2006.

* cited by examiner

*Primary Examiner*—Frank Tsay
(74) *Attorney, Agent, or Firm*—Madan, Mossman, & Sriram, P.C.

(57) ABSTRACT

An aqueous, viscoelastic treating fluid gelled with a crosslinked guar or guar derivative is stabilized and improved with an effective amount of a glycol, such as ethylene glycol. These fluids are more stable in that viscosity is maintained, particularly at elevated temperatures. The additives may also increase viscosity to the point where less of a crosslinked guar or guar derivative gelling agent is required to maintain a given viscosity. These stabilized, enhanced, aqueous, viscoelastic fluids may be used as treatment fluids for subterranean hydrocarbon formations, such as in hydraulic fracturing.

26 Claims, 2 Drawing Sheets

Baseline Data @ 200°F

3% ELA-1 @ 200°F

4% ELA-1 @ 250°F
25 pptg Guar, 5% KCl

STABILIZING CROSSLINKED POLYMER GUARS AND MODIFIED GUAR DERIVATIVES

FIELD OF THE INVENTION

The present invention relates to aqueous, viscoelastic fluids used during hydrocarbon recovery operations, and more particularly relates, in one embodiment, to methods and additives for stabilizing and improving such aqueous, viscoelastic fluids.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

Polymers are used in the past as gelling agents in fracturing fluids to carry or suspend solid particles in the brine. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Typical polymers include, but are not necessarily limited to xanthan gums, guar gums and guar gum derivatives. While it is desirable to use such polymers in aqueous, gelled treating fluids, under certain conditions or applications, it is preferred to minimize or reduce the polymer proportion to avoid or minimize some of the problems noted.

It would be desirable if a composition and method could be devised to stabilize and enhance aqueous polymer-gelled fluids used in injection of treatment fluids such as fracturing fluids.

SUMMARY OF THE INVENTION

Accordingly, it is an object of the present invention to provide an aqueous treatment fluid, such as those used in hydrocarbon recovery operations, that is viscosified with a polymer that is relatively stable over time.

It is another object of the present invention to provide a method for treating a subterranean formation using an aqueous viscoelastic fluid that has been stabilized using a readily available additive.

Still another object of the invention is to provide an aqueous viscoelastic fluid gelled with a polymer, such as guar or a guar derivative that is stabilized and inhibited against precipitation at relatively high temperatures.

In carrying out these and other objects of the invention, there is provided, in one form, a method for treating a subterranean formation that involves providing an aqueous gelled fluid which has an aqueous base fluid; a crosslinked guar or guar derivative gelling agent; and an amount of glycol effective to increase stability of the fluid. The aqueous galled fluid is injected through a wellbore and into the subterranean formation. The subterranean formation is then treated by the fluid.

There is further provided in another non-limiting embodiment of the invention an aqueous gelled fluid that contains an aqueous base fluid; a crosslinked guar or guar derivative gelling agent; and an amount of glycol effective to increase stability of the fluid.

DETAILED DESCRIPTION OF THE INVENTION

Figure 1:
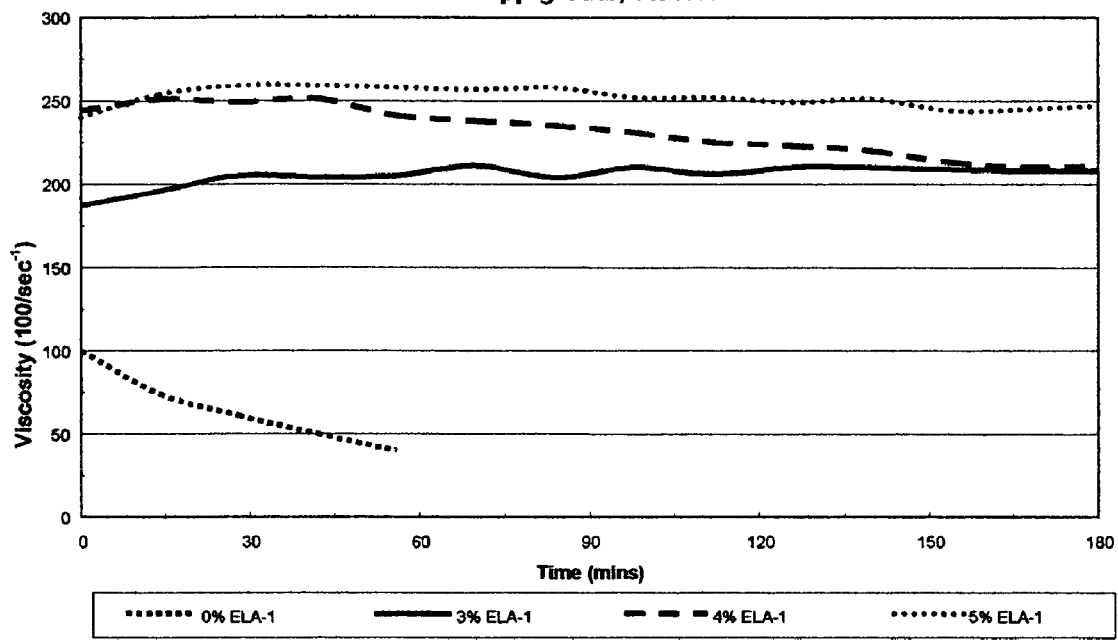
FIG. 1 is a graph of viscosity of 20 pounds per thousand gallons (pptg) (2.4 kg/m$^3$) guar, 5% KCl brine fluids as a function of time for fluids having no additives and varying levels of additives of this invention, at 200° F. (93° C.)

It has been discovered that the addition of glycols, such as ethylene glycol, to an aqueous fluid gelled with a guar gum or guar gum derivative can increase the viscosity of the fluid and/or stabilize the fluid brines. In particular, the gelled aqueous fluids are more stable at high temperatures, such as in the range of from about 80° F. (27° C.) to about 350° F. (177° C.). This discovery will allow the guar and guar derivative polymer systems to be used at a higher temperature, and will help minimize formation damage after hydraulic fracturing operations when less of the guar polymer is used, but the same viscosity is achieved through use of a glycol. That is, the introduction of these additives to the guar polymer systems could possibly lower the amount of guar polymer needed to obtain the fluid viscosity necessary to perform gelled fluid applications or treatments.

In the method of the invention, an aqueous fracturing fluid, as a non-limiting example, is first prepared by blending a guar or guar derivative into an aqueous fluid. The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

Any suitable mixing apparatus may be used for this procedure. In the case of batch mixing, the polymer guar or guar derivative and the aqueous fluid are blended for a period of time sufficient to form a gelled or viscosified solution. The hydratable polymer that is useful in the present invention can be, but is not necessarily limited to, any of the hydratable polysaccharides having galactose or mannose monosaccharide components and are familiar to those in the well service industry. These polysaccharides are capable of gelling in the presence of a cross-linking agent to form a gelled base fluid, and while crosslinking is not absolutely necessary, it expected that in many cases the polymer will be crosslinked. For instance, suitable hydratable polysaccharides are the guars and derivatized guars, as non-limiting examples. Specific examples are guar gum and guar gum derivatives. Guar gum derivatives are defined herein as guar gum reacted with a compound having a different functional group than guar. In one non-limiting embodiment, the gelling agents are guar gum, hydroxypropyl guar, carboxymethyl guar, and carboxymethyl hydroxypropyl guar. The most preferred hydratable polymers for the present invention are guar gum and carboxymethyl hydroxypropyl guar and hydroxypropyl guar, in non-limiting cases.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pptg by volume of the total aqueous fluid (1.8 to 7.2 kg/m$^3$). In another non-limiting range for the present invention the concentration is about 20 to about 40 pptg (2.4 to 4.8 kg/m$^3$). In another non-restrictive version of the invention, the crosslinked guar or guar derivative gelling agent present in the aqueous base fluid ranges from about 25 to about 40 pptg (about 3 to about 4.8 kg/m$^3$) total fluid.

Figure 2:
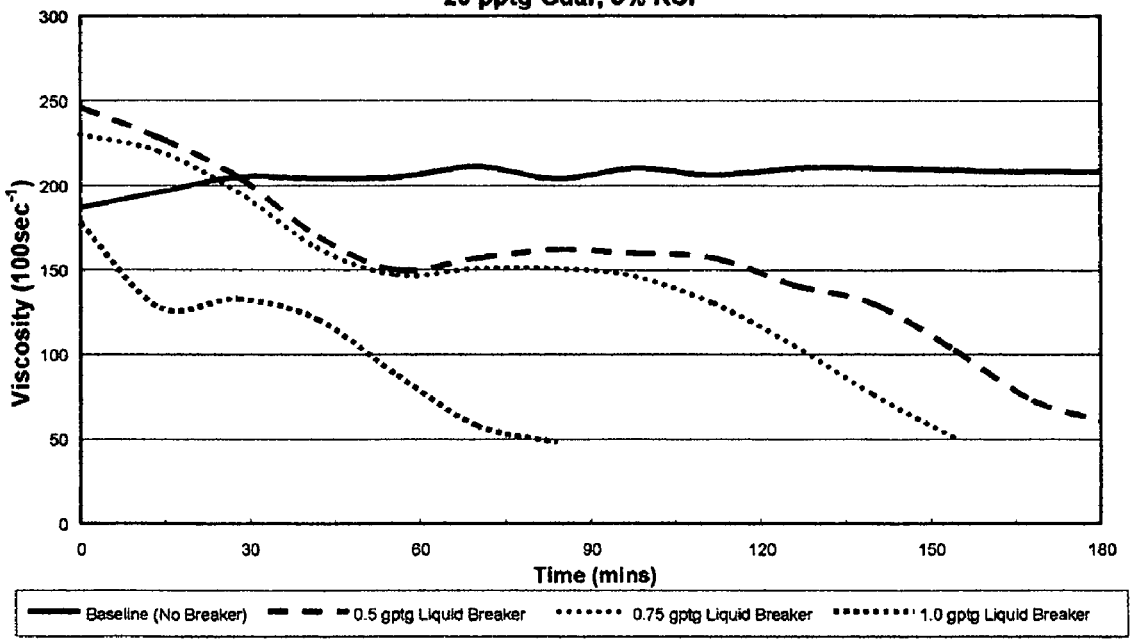
FIG. 2 is a graph of viscosity of 20 pptg (2.4 kg/m$^3$) guar, 5% KCl brine fluids as a function of time for fluids having 3 volume % of the ELA-1 additive of this invention with varying levels of a liquid breaker therein, at 200° F. (93° C.)

In some non-limiting examples to give a feel for proportions in some commercial fluids, in a 20 pptg (2.4 kg/m$^3$) guar fluid, such as used in the Examples of FIGS. 1 and 2, approximately 25 to 35 pptg (about 3 to about 4.2 kg/m$^3$) cross-linked guar would be added at 200° F. (93° C.). For a 25 pptg (3 kg/m$^3$) guar fluid, typically about 30 to 40 pptg guar (about 3.6 to about 4.8 kg/m$^3$) would be used at 250° F. (121° C.).

In addition to the hydratable polymer, the fracturing fluids of the invention typically include a crosslinking agent such as borate. The crosslinking agent can be any of the conventionally used borate crosslinking agents that are known to those skilled in the art. This includes any of the boron salts or boric acid as borate cross-linking agents. Guar and derivatized guar gels, which are crosslinked by the addition of borate ion donating materials are preferred within this embodiment over other crosslinking agents because they clean up faster and yield higher sand pack permeability than guar gels crosslinked with other crosslinking agents. However, other crosslinking agents that can be used with this embodiment besides borate, may include, but are not limited to, titanate, zirconate, and other metallic and semi-metallic high pH crosslinkers.

In the case of borate crosslinkers, the crosslinking agent is any material that supplies borate ions in solution. The amount of borate ions in solution is dependent on pH. Thus, the crosslinking agent can be any convenient source of borate ions, for instance the alkali metal and the alkaline earth metal borates and boric acid. In one non-limiting embodiment of the invention, the crosslinking additive is preferably a common type of borax present in the range from about 0.25 to in excess of 10.0 pptg of the total aqueous fluid (0.03 to in excess of 1.2 kg/m$^3$). In another non-restrictive version of the invention, the concentration of crosslinking agent is in the range from about 1.0 to about 3.0 pptg (0.12 to 0.34 kg/m$^3$) by volume of the total aqueous fluid. Similar considerations apply to the use of other crosslinkers.

The additives of this invention include, but are not necessarily limited to, glycols. In one non-limiting embodiment, the glycols have a molecular weight from about 40 to polyalkyl glycols having weight average molecular weights of about 120,000, alternatively up to about 50,000, and in another non-restrictive embodiment of the invention to about 7,500. Alternative lower molecular weight limits may range down to about 50, and in another non-restrictive embodiment down to about 60. Ethylene glycol having a molecular weight of about 62 should fall within all ranges. Other specific examples of glycols that are suitable in this invention include, but are not necessarily limited to, monoethylene glycol, diethylene glycol, monopropylene glycol, dipropylene glycol, monopropylene glycol, dibutylene glycol, polyethylene glycol, polypropylene glycol, 1,6-hexane glycol, 1,8-octanediol, 1,10-decane-diol, 2-methyl-1,3-propanediol, and the like. In one non-limiting embodiment of the invention, triols and higher functionality alcohols are optionally absent.

Liquid carrier soluble resins are used in some prior fluids, but in one non-limiting embodiment are absent herein. Such liquid carrier soluble resins include, but are not necessarily limited to, styrene-isoprene copolymers, styrene ethylene-propylene block copolymers, styrene isobutylene copolymers, styrene butadiene copolymers, polybutylene, polystyrene, polyethylene-propylene copolymers, methyl methacrylate and mixtures thereof.

In one non-restrictive embodiment, the amount of additive ranges from about 1 to about 10 volume %, based on the aqueous fluid. In another non-limiting version, the amount ranges from about 3 to about 5 vol %.

As noted, it has been discovered that aqueous gelled fluid treated with these additives have improved stability as compared with an otherwise identical fluid absent the additive. This is particularly true at elevated temperatures, such as equal to or greater than about 80° F. (27° C.) to about 350° F. (177° C.) or above. Alternatively, this temperature may range from about 175° F. (79° C.) to about 250° F. (121° C.) or above. In one non-limiting embodiment, the fluid is subjected to these temperatures for a period of time that might otherwise affect their stability during treating of a subterranean formation, such as for at least ½ hour. In another non-restrictive version, the time period is at least 8 hours. It should be understood that it is not necessary for the gelled fluid of the invention to be entirely stable for the invention to be considered successful, although indefinite stability is certainly a goal. It is enough that stability is improved for the invention to be considered successful.

It has also been discovered that the viscosity of the polymer-gelled aqueous fluid may increase using the additives of this invention. Thus, since the guar polymers are relatively more expensive, less of the guar polymers than normal may be used with the additives of this invention to achieve the same viscosity, thereby reducing the total cost of the gelled fluid.

In hydraulic fracturing applications, propping agents are typically added to the base fluid after the addition of the guar polymers. Propping agents, solid particles or gravel include, but are not limited to, for instance, quartz sand grains, glass and ceramic beads, sintered bauxite grains, sized calcium carbonate, sized salts, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design requires. These solids may also be used in a fluid loss control application.

A basic method is to inject the proppant into a carrier fluid or treatment brine downstream from the conventional pumps which are delivering the gravel packing fluid, e.g. To do this, the proppant is suspended in the viscosified brine. The proppant may thus be delivered by a small injection pump to the carrier fluid at an injection point downstream from the pumps used to transport the gravel packing fluid or other treatment fluid.

In another non-limiting embodiment of the invention, the fluid may contain sodium thiosulfate, which is also used for gel stability, typically for applications where the fluid is at 200° F. (93° C.) or above. Concentrations of sodium thiosulfate without the glycol additive of this invention may be on the order of about 1 to about 20 pptg (about 0.12 to about 2.4 kg/m$^3$). In applications where a glycol was also used, sodium thiosulfate proportions in this same range may still be used, although it would be expected that more typical proportions would be from about 1 to about 10 pptg (about 0.12 to about 1.2 kg/m$^3$).

While the viscoelastic fluids of the invention are described most typically herein as having use in fracturing fluids, it is expected that they will find utility in acidizing fluids, gravel pack fluids, stimulation fluids and the like. Of course, when the treatment fluid is a fracturing fluid, the fluids also contain at least an effective amount of a proppant to prop open the fractures, and the fluid is injected into the formation under sufficient and effective hydraulic pressure and pump rate to fracture the formation. When the treatment fluid is an acidizing fluid, it further contains an effective amount of an acid, either inorganic or organic, of sufficient strength to acidize the formation. These other components of the treatment fluids are well known in the art.

In another embodiment of the invention, the treatment fluid may contain additives including, but not necessarily limited to, other viscosifying agents, water wetting surfactants, clay stabilization additives, scale dissolvers, biopolymer degradation additives, pH buffers, biocides, surfactants, non-emulsifiers, anti-foamers, inorganic scale inhibitors, colorants, clay control agents, and other common components. Various breaking agents may be used with the method and compositions of this invention to reduce or "break" the gel of the fluid, including but not necessarily limited to enzymes, oxidizers, polyols, aminocarboxylic acids, and the like, along with gel breaker aids. In one non-limiting embodiment of the invention, oxidizers at lower temperatures (below about 200° F. or about 93° C.) may not be recommended because they may lower the cross-liked viscosity too much. Polyols such as those described in U.S. Pat. No. 6,617,285 to James B. Crews of Baker Hughes may be used; this patent is incorporated herein in its entirety by reference. Aminocarboxylic acid breakers such as those described in U.S. Pat. No. 6,706,769 also to James B. Crews of Baker Hughes may be employed, and this patent is additionally incorporated herein in its entirety by reference.

The invention will be further described with respect to the following Examples which are not meant to limit the invention, but rather to further illustrate the various embodiments.

EXAMPLE 1

FIG. 1 presents graphs of fluids containing varying concentrations of ELA-1 (Experimental Liquid Additive 1; ethylene glycol) and one test without in a guar gelled fluid at the elevated temperature of 200° F. (93° C.). These fluids contained normal amounts of conventional additives: antifoam, biocide, surface tension reducer, non-emulsifier, clay stabilizer, pH buffer, gel stabilizer and a borate crosslinker. The lowest, gray curve corresponds to the baseline where no stabilizer was added to the fluid as expected, the viscosity was low. The purpose of FIG. 1 was to show the effective stability gained with the use of the inventive stabilizer. Note that the curve for 0% ELA-1 is the performance of a typical 20 pptg (2.4 kg/m$^3$) crosslinked fluid at 200° F. (93° C.) without the ELA-1. The other fluids with ELA-1 had considerably increased viscosity.

EXAMPLE 2

FIG. 2 shows that fluids with 3 vol % ELA-1 baseline test and the use of a liquid breaker with all of the additives of Example 1 at 200° F. (93° C.) to prove that even though the viscosity of the low polymer fluid can be stabilized with ELA-1, the viscosity can still be reduced by the use of breakers. The liquid breaker used was a polyol of U.S. Pat. No. 6,617,285 mentioned previously. It will be appreciated that the proportions given of gallons per thousand gallons (gptg) are essentially dimensionless and are readily translated to other units (e.g. liter per thousand liters) as the same values.

EXAMPLE 3

Figure 3:
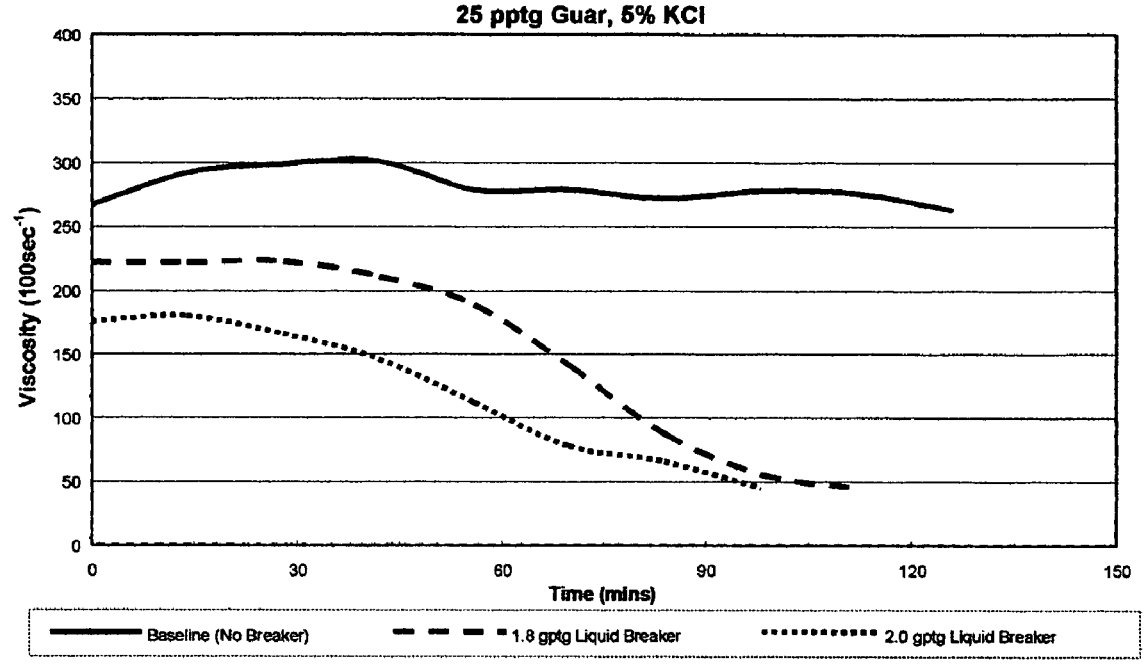
FIG. 3 is a graph of viscosity of 25 pptg (3 kg/m$^3$) guar, 5% KCl brine fluids as a function of time for fluids having 4 volume % of the ELA-1 additive of this invention with varying levels of a liquid breaker therein, at 250° F. (121° C.).

FIG. 3 shows that fluids with 4 vol % ELA-1 baseline test and the use of a liquid breaker with all of the additives of Example 1 at 250° F. (121° C.) to prove that even though the viscosity of the low polymer fluid can be stabilized with ELA-1, the viscosity can still be reduced by the use of breakers. The liquid breaker used was a blend of the polyol of Example 2 with tetrasodium ethylenediaminetetraacetic acid (Na$_4$EDTA) of U.S. Pat. No. 6,706,769 mentioned previously.

In the foregoing specification, the invention has been described with reference to specific embodiments thereof, and has been demonstrated as effective in providing a treatment fluid with stable surfactant gel viscosity. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, guar or guar derivative gelling agents, glycols and other components falling within the claimed parameters, but not specifically identified or tried in a particular composition, are expected to be within the scope of this invention.

We claim:

1. A method for treating a subterranean formation comprising:
   providing an aqueous gelled fluid comprising:
   an aqueous base fluid;
   a crosslinked guar or guar derivative gelling agent; and
   an amount of glycol effective to increase stability of the fluid;
   injecting the aqueous gelled fluid through a wellbore and into the subterranean formation; and treating the subterranean formation
where the crosslinked guar or guar derivative gelling agent present in the aqueous base fluid ranges from about 15 to about 60 pptg (about 1.8 to about 7.2 kg/m³) total fluid.

2. The method of claim 1 where the aqueous base fluid is brine.

3. The method of claim 1 where the glycol is selected from glycols or polyalkyl glycols ranging in molecular weight from about 40 to about 120,000.

4. The method of claim 1 where the effective amount of the glycol ranges from about 1 to 10 about vol % based on the aqueous gelled fluid.

5. The method of claim 1 where the aqueous gelled fluid has improved stability as compared with an otherwise identical fluid absent the glycol.

6. The method of claim 1 where the aqueous gelled fluid has lower gelling agent loading to achieve the same viscosity as compared with an otherwise identical fluid absent the glycol.

7. The method of claim 1 where the crosslinker for the crosslinked guar or guar derivative gelling agent is selected from the group consisting of borate ion, titanate ion and zirconate ion.

8. The method of claim 1 where treating the subterranean formation is selected from the group consisting of
fracturing the formation under effective pressure where the aqueous gelled fluid further comprises a proppant;
acidizing the formation where the aqueous gelled fluid further comprises an acid;
packing the formation with gravel where the aqueous gelled fluid further comprises gravel; and
combinations thereof.

9. The method of claim 1 where for a period of time during the method the fluid is at a temperature in the range of about 80° F. (27° C.) to about 350° F. (177° C.).

10. A method for treating a subterranean formation comprising:
providing an aqueous gelled fluid comprising:
a brine base fluid;
a crosslinked guar or guar derivative gelling agent; and
an amount of glycol effective to increase stability of the fluid;
injecting the aqueous gelled fluid through a wellbore and into the subterranean formation; and
treating the subterranean formation, where the treating is selected from the group consisting of:
fracturing the formation under effective pressure where the aqueous gelled fluid further comprises a proppant;
acidizing the formation where the aqueous gelled fluid further comprises an acid;
packing the formation with gravel where the aqueous gelled fluid further comprises gravel; and
and combinations thereof.

11. The method of claim 10 where the glycol is selected from glycols or polyalkyl glycols ranging in molecular weight from about 40 to about 120,000.

12. The method of claim 10 where the effective amount of the glycol ranges from about 1 to about 10 vol % based on the aqueous gelled fluid.

13. The method of claim 10 where crosslinked guar or guar derivative gelling agent present in the aqueous base fluid ranges from about 15 to about 60 pptg (about 1.8 to about 7.2 kg/m³) total fluid.

14. The method of claim 10 where the crosslinker for the crosslinked guar or guar derivative gelling agent is selected from the group consisting of borate ion, titanate ion and zirconate ion.

15. The method of claim 10 where for a period of time during the method the fluid is at a temperature in the range of about 80° F. (27° C.) to about 350° F. (177° C.).

16. An aqueous gelled fluid comprising:
an aqueous base fluid;
a crosslinked guar or guar derivative galling agent; and
an amount of glycol effective to increase stability of the fluid where the crosslinked guar or guar derivative palling agent present in the aqueous base fluid ranges from about 15 to about 60 pptg (about 1.8 to about 7.2 kg/m³) total fluid.

17. The aqueous gelled fluid of claim 16 where the aqueous base fluid is brine.

18. The aqueous gelled fluid of claim 16 where the glycol is selected from glycols or polyalkyl glycols ranging in molecular weight from about 40 to about 120,000.

19. The aqueous gelled fluid of claim 16 where the effective amount of the glycol ranges from about 1 to about 10 vol % based on the aqueous gelled fluid.

20. The aqueous gelled fluid of claim 16 where the aqueous gelled fluid has improved stability as compared with an otherwise identical fluid absent the glycol.

21. The aqueous gelled fluid of claim 16 where the crosslinker for the crosslinked guar or guar derivative gelling agent is selected from the group consisting of borate ion, titanate ion and zirconate ion.

22. An aqueous gelled fluid comprising:
a brine base fluid;
a crosslinked guar or guar derivative gelling agent; and
from about 1 to about 10 vol % glycol effective to increase stability of the fluid, based on the aqueous gelled fluid.

23. The aqueous gelled fluid of claim 22 where the glycol is selected from glycols or polyalkyl glycols ranging in molecular weight from about 40 to about 120,000.

24. The aqueous gelled fluid of claim 22 where the aqueous gelled fluid has improved stability as compared with an otherwise identical fluid absent the glycol.

25. The aqueous gelled fluid of claim 22 where crosslinked guar or guar derivative gelling agent present in the aqueous base fluid ranges from about 15 to about 60 pptg (about 1.8 to about 7.2 kg/m³) total fluid.

26. The aqueous gelled fluid of claim 22 where the crosslinker for the crosslinked guar or guar derivative gelling agent is selected from the group consisting of borate ion, titanate ion and zirconate ion.

* * * * *

UNITED STATES PATENT AND TRADEMARK OFFICE
CERTIFICATE OF CORRECTION

| | |
|---|---|
| PATENT NO. | : 7,195,065 B2 |
| APPLICATION NO. | : 10/911898 |
| DATED | : March 27, 2007 |
| INVENTOR(S) | : Patrick Arthur Kelly, Allen Dale Gabrysch and Donald Nelson Horner |

Page 1 of 1

It is certified that error appears in the above-identified patent and that said Letters Patent is hereby corrected as shown below:

Column 2, line 15: please change "galled" to read -- gelled --

Claim 16:

Column 8, line 19: please change "palling" to read -- gelling --

Signed and Sealed this

Twenty-sixth Day of June, 2007

JON W. DUDAS
*Director of the United States Patent and Trademark Office*